United States Patent Office 3,468,975
Patented Sept. 23, 1969

3,468,975
PROCESS FOR THE MANUFACTURE OF ELASTOMERIC BLOCK COPOLYMERS CONTAINING POLYAMIDE AND POLYESTER SEGMENTS
Frederick Keith Duxbury, John David Garforth, and Peter McNeeney, Manchester, England, assignors to Imperial Chemical Industries Limited, London, England, a corporation of Great Britain
No Drawing. Filed June 30, 1966, Ser. No. 561,704
Claims priority, application Great Britain, July 2, 1965, 28,133/65; May 13, 1966, 21,414/66
Int. Cl. C08g 20/30
U.S. Cl. 260—857                                10 Claims

ABSTRACT OF THE DISCLOSURE

Elastomeric block copolymers containing polyamide and polyester segments are manufactured by heating in the presence of an esterification or ester-amide interchange catalyst a mixture of a polyamide with a polyester having a melting point below 60° C. or a polyester-forming component or mixture of such components which give rise to a said polyester, or of a polyamide-forming component or mixture of such components with a said polyester.

---

This invention relates to copolymers containing polyamide and polyester segments.

We have found that valuable copolymers having elastic properties may be obtained by copolymerising polyamides with certain polyesters, or with polyester-forming components which give rise to these polyesters. We have also found that copolymers having similar properties may also be obtained by using a mixture of polyamide-forming components instead of the polyamide in the copolymerisation.

Thus the invention provides a process for the manufacture of elastomeric block copolymers containing polyamide and polyester segments which comprises copolymerising (1) an amide constituent consisting of a polyamide or a polyamide-forming component or a mixture of such components with (2) an ester constituent consisting of a polyester having a melting point below 60° C. or a polyester-forming component or mixture of such components which give rise to a said polyester, by heating the said constituents in the presence of a catalyst.

The polyamides which may be used in the process of our invention are preferably those obtained by the polycondensation of diamines with dicarboxylic acids, or of amino carboxylic acids or of the lactams derived from the said amino carboxylic acids. Suitable diamines include aliphatic diamines, especially, alkylene diamines having the general formula—

$$NH_2(alkylene)NH_2 \qquad \text{Formula I}$$

in which the alkylene group contains from 2 to 14 carbon atoms. Especially suitable are those alkylene diamines of the above Formula I in which the alkylene group consists of a chain of methylene groups which are unsubstituted or consists of a chain of methylene groups one or more of which has one of its hydrogen atoms substituted by a methyl group. As examples of such alkylene diamines there may be mentioned tetramethylene diamine, hexamethylene diamine, octamethylene diamine, dodecamethylene diamine, 2-methylhexamethylene diamine, 3-methylhexamethylene diamine and 3,4-dimethylhexamethylene diamine. Hexamethylene diamine is particularly suitable. Suitable diamines also include araliphatic diamines such as m-xylylene diamine and p-xylylene diamine.

Suitable dicarboxylic acids include aliphatic dicarboxylic acids, especially aliphatic dicarboxylic acids having the general formula—

$$HO_2C—A—CO_2H \qquad \text{Formula II}$$

in which A is a direct link or an alkylene group containing from 1 to 14 carbon atoms. Especially suitable are those alkylene dicarboxylic acids of the above Formula II in which A represents an alkylene group which consists of a chain of methylene groups which are unsubstituted or which consists of a chain of methylene groups one or more of which has one of its hydrogen atoms substituted by a methyl group. As examples of such alkylene dicarboxylic acids there may be mentioned malonic acid, succinic acid, glutaric acid, adipic acid, pimelic acid, suberic acid, azelaic acid, sebacic acid, undecandioic acid, dodecandioic acid, 2-methyladipic acid (2-methylhexan-1,6-dioic acid), 3-methyladipic acid and 3,4-dimethyladipic acid. Suitable dicarboxylic acids also include aromatic dicarboxylic acids such as terephthalic acid, substituted terphthalic acids and isophthalic acid. They also include cycloaliphatic dicarboxylic acids such as cyclohexane-1,4-dicarboxylic acid (hexahydroterephthalic acid).

Suitable amino carboxylic acids are the aliphatic amino carboxylic acids and especially those aliphatic aminocarboxylic acids having the general formula—

$$HO_2C(alkylene)NH_2 \qquad \text{Formula III}$$

and the lactams derived from the said aminocarboxylic acids which have the general formula—

$$\begin{bmatrix} \text{—alkylene—} \\ \text{CO—NH} \end{bmatrix} \qquad \text{Formula IV}$$

in both of which formulae the alkylene group contains from 2 to 12 carbon atoms. Especially suitable are those aminocarboxylic acids of the above Formula III and those lactams of the above Formula IV in which the alkylene group consists of a chain of methylene groups which are unsubstituted or consists of a chain of methylene groups one or more of which has one of its hydrogen atoms substituted by a methyl group. Examples of such aminocarboxylic acids or lactams include 6-aminocaproic acid (6-aminohexanoic acid) 11-aminoundecanoic acid, 3-, 4-, 5-, or 6-methyl-6-aminocaproic acid, caprolactam, dodecanolactam and 3-, 4,- 5-, or 6-methylcaprolactam.

In preparing the polyamides used in the process of our invention there may be used as components of the polycondensate, instead of a single diamine, dicarboxylic acid, aminocarboxylic acid or lactam, mixtures of two or more of the said components. The polyamides obtained from the said diamines and dicarboxylic acids or from the said aminocarboxylic acids or lactams may have a molecular weight within the range 400 to 20,000 but preferably have a molecular weight within the range 1000 to 5000 and a melting point greater than 200° C. The end groups of the said polyamides may contain a major proportion of carboxyl groups or a major proportion of amino groups or an approximately equal proportion of each type of group.

Particular examples of suitable polyamides are polyhexamethylene adipamide, polyhexamethylene sebacamide, dodecamethylene terephthalamide, polyhexamethylene oxamide, polyhexamethylene terephthalamide and polycaprolactam.

Instead of the polyamide itself there may be used in the copolymerisation a polyamide-forming component, for example an amino-carboxylic acid or lactam, or a mixture of polyamide-forming components, for example a mixture of a diamine and a dicarboxylic acid, which mixture may be in the form of a salt of a diamine with a dicarboxylic acid. The polyamide-forming component or components undergo polycondensation in the copolymerisation mixture to form a polyamide which then copolymerises with the polyester.

Particular examples of suitable polyamide-forming components are caprolactam, aminocaproic acid, hexamethylenediamine adipate, hexamethylenediamine sebacate, dodecamethylenediamine terephthalate, a mixture of dibutyl oxalate and hexamethylenediamine, and hexamethylenediamine terephthalate.

The polyesters which may be used in the process of our invention have a melting point less than 60° C. Preferred polyesters are those obtained by the polycondensation of glycols with dicarboxylic acids. Suitable glycols are alkylene or cycloalkylene glycols, especially those in which the alkylene or cycloalkylene group contains from 2 to 10 carbon atoms. Examples of such glycols include ethylene glycol, 1,2- and 1,3-propanediol, 1,4-butanediol, 2,2-dimethyl-1,3-propanediol(neopentyl glycol), 1,5-pentanediol, 1,6-hexanediol, 1,10-decanediol and 1,4-di(methylol)cyclohexane. 2,2-dimethyl-1,3-propanediol is particularly suitable. Suitable glycols also include diethylene glycol and triethylene glycol.

Suitable dicarboxylic acids for use in preparing the polyesters include aliphatic dicarboxylic acids, especially aliphatic dicarboxylic acids having the Formula II, above, in which A is a direct link or an alkylene group containing from 1 to 14 carbon atoms. Examples of suitable dicarboxylic acids include, malonic acid, succinic acid, glutaric acid, adipic acid, 2- or 3-methyladipic acid, 3,4-dimethyladipic acid, pimelic acid, suberic acid, azelaic acid, sebacic acid and dodecandioic acid. Sebacic acid is particularly suitable. Where the polyamide used in the process of the invention is based on a dicarboxylic acid, the dicarboxylic acid used in preparing the polyester may be the same dicarboxylic acid, but this is not essential. Instead of the dicarboxylic acids themselves, derivatives of the dicarboxylic acids which will condense with the glycols to form the polyesters may be used. Examples of such dicarboxylic acid derivatives are the lower alkyl esters, for example the methyl esters, which react with the glycols by an ester interchange mechanism.

Polyesters suitable for use in the process of our invention may also be obtained by polycondensation of hydroxyacids or their derived lactones, for example caprolactone.

In preparing the polyesters used in the process of our invention there may be used as components of the polycondensate, instead of a single glycol, dicarboxylic acid, hydroxyacid or lactone, mixtures of two or more of the said compounds. The polyesters preferably have a molecular weight within the range 1000 to 5000. The end groups of the polyester may contain a major proportion of carboxyl groups or a major proportion of hydroxyl groups or an approximately equal proportion of each type of group.

A particularly suitable polyester is poly-2,2-dimethyl-1,3-propanediol sebacate owing to its great stability at the high temperatures required for the copolymerisation.

Instead of the polyester itself there may be used in the copolymerisation the polyester-forming component or a mixture of the polyester-forming components from which the polyester is derived. This component or mixture of components condenses under the influence of heat to form the polyester which then undergoes copolymerisation with the polyamide. A particularly suitable component is a mixture of 2,2-dimethyl-1,3-propanediol and sebacic acid.

The copolymerisation is effected by heating the mixture of amide constituent and ester constituent in the presence of a catalyst. Heating normally takes place within the range 200° C. to 300° C. for periods ranging from 5 hours to 20 hours. In many cases it is convenient to raise the temperature as the copolymerisation proceeds. The catalyst used is an esterification or ester-amide interchange type catalyst. Examples of such catalysts include zinc chloride, lead oxide, tetrabutyl titanate, aluminium stearate and zinc stearate. It is advantageous to carry out the copolymerisation in an inert atmosphere, for example an atmosphere of nitrogen.

In some cases it may be advantageous to include in the copolymerisation mixture, in addition to the polyamide (or polyamide-forming components) polyester (or polyester-forming components) and the catalyst, a proportion (or in the case where the polyester-forming components are used, a further proportion) of the glycol from which the polyester is derived or of some other glycol. This is particularly the case where both the polyamide and the polyester present initially in the mixture or formed in the mixture from the requisite components contain a major proportion of carboxyl end groups.

The proportion of polyamide to polyester in the copolymer may vary within wide limits, for example within the range 10:90 to 60:40 by weight. A higher proportion of polyester gives products having a greater degree of elasticity. Preferably the said proportion lies within the range 20:80 to 50:50 and we particularly prefer a proportion of about 30:70. The proportions of amide constituent to ester constituent used in the process are chosen so as to give copolymers with the foregoing proportions of polyamide to polyester.

The elastic properties of the copolymers may be modified by bringing about some degree of cross-linking between the polymer chains. This may be achieved by incorporating in the copolymerisation mixture up to about 2% of a polyfunctional acid, amine or alcohol the functionality of which is three or more. Examples of such polyfunctional compounds are trimesic acid, bis-hexamethylene triamine, glycerol and pentaerythritol. Alternatively, the polyamides or polyesters from which the copolymers are formed may themselves be cross-linked; for example there may be used a polyamide obtained by polycondensation of a dicarboxylic acid with a diamine containing a proportion of a polyamine with a functionality of at least three, for example bis-hexamethylenetriamine.

There may also be incorporated in the copolymerisation mixture additives such as antioxidants, heat stabilisers, light stabilisers, viscosity stabilisers or delustrants. Owing to the relatively high temperatures and long times often required for copolymerisation, it may be particularly advantageous to incorporate an antioxidant, for example triphenyl phosphite.

The copolymers of the process of our invention are block copolymers which are rubbery or elastic solids. The copolymers have molecular chains consisting of alternate segments of polyester and polyamides linked either by carboxylic ester or by carbonamide groups. It is indeed surprising that the process of our invention, involving as it does copolymerisation at a high temperature in the presence of a catalyst, gives rise to elastic block copolymers. The reaction conditions are such as would favour interchange between the amide groups of the polyamide and the ester groups of the polyester, so that splitting and reforming of the polyamide and polyester chains would be expected to occur. Such interchange would lead ultimately to a completely random copolymer devoid of elastic properties. The conditions which would normally be chosen to obtain block copolymers in those cases such as the present where the components contain interchangeable groups, would be, for example, copolymerisation at relatively mild temperatures in a solvent. In the process of our invention some degree of interchange between the groups undoubtedly does occur, so that the distribution of chain length in the polyamide and polyester segments of the copolymer is probably different from the distribution of chain length in the polyamide and polyester components from which the copolymer is derived; but the products are nevertheless block copolymers with elastic properties. Again, the use of polyamide-forming components or polyester-forming components instead of a polyamide or polyester respectively would be expected to favour the formation of random copolymers, but nevertheless when such components are used in the process of our invention block copolymers are obtained.

Even more surprisingly we have found that some degree of randomisation improves the elastic properties of the products, but naturally if too great a degree of randomisation occurs the elastic properties deteriorate. We have found that although products with good elastic properties are obtained by any of the variants of the process of our invention, particularly good products are obtained when a preformed polyamide is copolymerised with a mixture of polyester forming components.

The copolymers are probably mixtures of compounds containing repeat units which can usually be represented by the general formula—

in which A represents a polyamide segment, E represents a polyester segment and X represents the group —OCO— when it links a polyester segment containing a terminal hydroxy group to a polyamide segment containing a terminal carboxyl group, or the group —NHCO— when it links a polyamide segment containing a terminal amino group to a polyester segment containing a terminal carboxyl group. The values of X in any single repeat unit are not necessarily the same, and the polyamide and polyester segments are not necessarily the same, and are probably different, in successive repeat units.

The copolymers of the process of our invention normally have molecular weights above 5000 and melting points within the range 120° C. to 250° C. They are useful for the formation of elastic shaped articles. Those copolymers having molecular weights greater than approximately 8000 may be formed into elastic filaments and fibres by melt spinning techniques.

The invention is illustrated but not limited by the following examples in which the parts and percentages are by weight.

All yarns were treated with steam at 2 pounds per square inch for 15 minutes prior to testing.

Example 1

A low molecular weight polyhexamethylenediamine sebacate (6, 10 nylon) is prepared by reacting:

106 parts hexamethylenediamine sebacate (6, 10 salt)
21 parts sebacic acid at 250° C. with stirring in an atmosphere of nitrogen for 2 hours followed by heating at the same temperature in a vacuum (15 mm.) for 2¼ hours and then in a high vacuum (0.5 mm.) for 1¼ hours. The polyamide thus prepared has molecular wieght about 1200 and contains predominantly carboxyl end groups.

A mixture of the following:

30 parts, 6, 10 nylon prepared as above
30.3 parts sebacic acid
21.6 parts 2,2-dimethyl-1,3-propanediol
0.75 part anhydrous zinc chloride is stirred under nitrogen for 2 hours at 220° C. and then at a temperature of 250° C. for a further 2 hours. Heating is continued at this temperature with continued stirring in a vacuum (15 mm.) for 1 hour and then in a high vacuum for 8 hours.

The product from the reaction could be melt spun into fibres which had a tenacity of 0.7 gram/denier, an elastic recovery from 50% extension of 95% and an extension of 104% at maximum load.

Example 2

Poly-2,2-dimethyl-1,3-propanediol sebacate is prepared by reaction of:
104 parts sebacic acid and
52 parts 2,2-dimethyl-1,3-propanediol at 175° C. with stirring in an atmosphere of nitrogen for 16 hours. The temperature is then raised to 220° C. and the product heated in a vacuum (15 mm.) at this temperature for 1½ hours and then in a high vacuum for 1 hour. The resulting polyester which is liquid at room temperature has a molecular weight of 2000–3000 and contains predominantly carboxyl end groups.

A mixture of the following:

35 parts poly-2,2-dimethyl-1,3-propane diol sebacate, prepared as above
35 parts 6, 10 nylon, prepared as in Example 1
4 parts anhydrous zinc chloride is heated with stirring in an atmosphere of nitrogen at 220° C. for 3 hours. The temperature is then raised to 260° C. and stirring continued for 4 hours. Stirring is continued at this temperature in a vacuum (15 mm.) for 1 hour and then in a high vacuum for 4½ hours.

The product from this reaction could be melt spun into fibres which had, after relaxation in steam, a tenacity of 0.7 gram/denier, an elastic recovery from 50% extension of 91% and an extension of 160% at break.

Example 3

A mixture of the following:

30 parts 6, 10 nylon, prepared as in Example 1
50.5 parts sebacic acid
33.8 parts 2,2-dimethyl-1,3-propanediol
1.15 parts anhydrous zinc chloride is stirred under nitrogen for 2 hours at 220° C. and then at a temperature of 260° C. for a further 3 hours. Heating is continued at this temperature for 1 hour under vacuum (15 mm.) and then high vacuum applied for 2 hours.

The product (softening point 130–151° C.) could be melt-spun into fibres which, after drawing at a ratio of 5.5×, had a tenacity of 0.3 gram/denier, an elastic recovery from 50% extension of 95.6% and an extension of 325% at break.

Example 4

A mixture of the following:

120 parts 6, 10 nylon (M.W. 1600) prepared as in Example 1
280 parts poly(2,2-dimethyl-1,3-propanediol sebacate) prepared as in Example 2 (M.W. 3000)
20 parts 2,2-methyl-1,3-propanediol
4.2 parts anhydrous zinc chloride is heated and stirred under nitrogen at 225° C. for 2 hours and then at a temperature of 260° C. for 3 hours. Heating is continued at this temperature for 1 hour under vacuum (15 mm.) and then high vacuum applied for 5 hours.

The product (softening point 141–163° C.) could be melt spun into fibres which, after drawing at a ratio of 5.0×, had a tenacity of 0.36 gram/denier, an elastic recovery from 50% extension of 92.7% and an extension of 277% at break.

Example 5

A mixture of the following:

30 parts 6, 10 nylon polymer (M.W. 18,000)
53 parts sebacic acid
36 parts 2,2-dimethyl-1,3-propanediol
0.2 part tetrabutyl titanate is heated and stirred under nitrogen at 220° C. for 1 hour and then at a temperature of 260° C. for 2¾ hours. Heating is continued at this temperature for 1 hour under vacuum (15 mm.) and then high vacuum applied for 1¼ hours.

The product (softening point 172° C.) could be melt spun into fibres which, after drawing at a ratio of 5.0×, had a tenacity of 0.5 gram/denier, an elastic recovery from 50% extension of 96.9% and an extension of 218% at break.

Example 6

A mixture of the following:

40 parts 6, 10 nylon (M.W. 1200) prepared as in Example 1
30 parts sebacic acid
23 parts 2,2-dimethyl-1,3-propanediol
0.145 part pentaerythritol
1.0 part anhydrous zinc chloride is heated and stirred under nitrogen at 220° C. for 2 hours and then at a temperature of 260° C. for 2 hours. Heating is continued at this temperature for 1 hour under vacuum (15 mm.) and then high vacuum applied for 20 minutes.

The product (softening point 157–176° C.) could be melt spun into fibres which, after being drawn at a ratio of 4.0×, had a tenacity of 0.77 gram/denier, an elastic recovery from 50% extension of 93.9% and an extension of 143% at break.

Example 7

A mixture of the following:

318 parts hexamethylenediamine sebacate (6, 10 nylon salt)
62 parts sebacic acid
0.72 part bis-hexamethylenetriamine were reacted to produce a cross-linked low molecular weight 6:10 nylon of approximate molecular weight 1000 by the method given in Example 1.

A mixture of the following:

20 parts, 6, 10 nylon prepared as above
35.3 parts sebacic acid
24 parts 2,2-dimethyl-1,3-propanediol
0.15 part tetrabutyl titanate is heated and stirred under nitrogen at 220° C. for 2 hours and then at a temperature of 260° C. for 2 hours. Heating is continued at this temperature for 1 hour, under vacuum (15 mm.) and then high vacuum applied for 3 hours.

The product (softening point 137–157° C.) could be melt spun into fibres which, after being drawn at a ratio of 5.0×, had a tenacity of 0.48 gram/denier, an elastic recovery from 50% extension of 97.9% and an extension of 457% at break.

Example 8

A mixture of the following:

38 parts hexamethylenediamine solution (aqueous 59% w./w.)
52.8 parts sebacic acid
0.72 part bis-hexamethylenetriamine is heated and stirred under nitrogen the temperature being raised to 250° C. over a period of 1 hour. Stirring is continued at this temperature for 1¾ hours and then vacuum (15 mm.) applied for 1 hour. High vacuum is then applied for ¾ hour. The polyamide thus prepared has molecular weight about 1200 and is predominantly carboxyl ended.

A mixture of the following:

30 parts 6, 10 nylon prepared as above
53 parts sebacic acid
36 parts 2,2-dimethyl-1,3-propanediol
0.2 part tetrabutyl titanate is heated and stirred under nitrogen at 220° C. for 2 hours and then at a temperature of 260° C. for 2 hours. Heating is continued at this temperature for 1 hour under vacuum (15 mm.) and then high vacuum is applied for 2¾ hours.

The product (softening point 139–159° C.) could be melt spun into fibres which, after being drawn at a ratio of 5.0×, had a tenacity of 0.7 gram/denier, an elastic recovery from 50% extension of 98.2% and an extension of 278% at break.

Example 9

A mixture of the following:

38 parts hexamethylenediamine solution (aqueous 59% w./w.)
52.3 parts sebacic acid
1.44 parts bis-hexamethylenetriamine is reacted by the method of Example 8 to produce a low molecular weight 6, 10 nylon.

A mixture of the following:

30 parts 6, 10 nylon prepared as above
53 parts sebacic acid
36 parts 2,2-dimethyl-1,3-propanediol
0.2 part tetrabutyl titanate is reacted by the method of Example 8.

The product (softening point 139–157° C.) could be melt spun into fibres which, after being drawn at a ratio of 6.0×, had a tenacity of 0.8 gram/denier, an elastic recovery from 50% extension of 98.3% and an extension of 262% at break.

Example 10

A mixture of the following:

70 parts nylon 6,6-salt (hexamethylenediamine adipate)
36 parts sebacic acid
32 parts 2,2-dimethylpropane-1,3-diol
0.1 part tetrabutyl titanate
0.5 part triphenylphosphite is heated and stirred under nitrogen at 260° C. for 3 hours and then at the same temperature for 8 hours under high vacuum. The temperature is raised to 280° C. and vacuum treatment continued for 2 hours.

The product (softening point 147–184° C.) could be melt spun into fibres which, after being drawn at a ratio of 5.0× at a temperature of 70° C. had a tenacity of 0.98 gram/denier, an elastic recovery from 50% extension of 91.2% and an extension of 133% at break.

Example 11

A mixture of the following:

35.6 parts nylon 6,6-salt
9.3 parts adipic acid
60 parts poly(2,2-dimethyl-1,3-propanediol sebacate) M.W. 1350 (prepared as in Example 2)
20 parts 2,2-dimethyl-1,3-propanediol
0.5 part tetrabutyl titanate
0.5 part triphenyl phosphite is heated and stirred under nitrogen at 260° C. for 3 hours and then at the same temperature for 4 hours under high vacuum.

The product (softening point 176–190° C.) could be melt spun into fibres which, after being drawn at a ratio of 5.0×, had a tenacity of 0.51 gram/denier, an elastic recovery from 50% extension of 98.0% and an extension of 232% at break.

Example 12

A mixture of the following:

445.5 parts nylon 6,6-salt
116 parts adipic acid is heated and stirred under nitrogen, the temperature being raised to 200° C. over a period of ½ hour. The temperature is then raised further to 270° C. over a period of 1 hour the mixture then being stirred at this temperature for 3 hours.

The product a low molecular weight 6,6 nylon (M.W.

730), had predominantly carboxylic end groups.

A mixture of the following:

40 parts 6,6-nylon prepared as above
60 parts poly(2,2-dimethyl-1,3-propanediol sebacate) M.W. 1350 (prepared as in Example 2)
11.4 parts 2,2-dimethyl-1,3-propanediol
0.5 part tetrabutyl titanate
0.5 part triphenyl phosphite is heated and stirred under nitrogen at 260° C. for 3 hours and then at the same temperature for 3 hours under high vacuum.

The product (softening point 199–221° C.) could be melt spun into fibres which, after being drawn at a ratio of 7.33×, had a tenacity of 0.55 gram/denier, an elastic recovery from 50% extension of 97.4% and an extension of 295% at break.

Example 13

A mixture of the following:

19.5 parts nylon 12, T salt (dodecamethylenediamine terephthalate)
41 parts poly(2,2-dimethyl-1,3-propanediol sebacate) M.W. 2000 (prepared as in Example 2)
2.7 parts 2,2-dimethyl-1,3-propanediol
0.1 part tetrabutyl titanate is heated and stirred under nitrogen at 220° C. for 1 hour and then at a temperature of 260° C. for 2 hours. Heating is continued at this temperature for 1 hour under vacuum (15 mm.) and then high vacuum applied for 25 minutes.

The product (softening point 119–143° C.) could be melt spun into fibres which, after being drawn at a ratio of 4.0×, had a tenacity of 0.6 gram/denier, an elastic recovery from 100% extension of 93.2% and an elongation 313% at break.

Example 14

A mixture of the following:

24.4 parts nylon 12 T-salt
40.4 parts sebacic acid
36.2 parts 2,2-dimethyl-1,3-propanediol
0.1 part tetrabutyl titanate is heated and stirred under nitrogen at a temperature of 280° C. for 1 hour and then at a temperature of 260° C. for 1 hour. Heating is continued at this temperature for 1 hour under vacuum (15 mm.) high vacuum then being applied for 3 hours.

The product (softening point 129–149° C.) could be melt spun into fibres which, after being drawn at a ratio of 4.0×, had a tenacity of 0.5 gram/denier, an elastic recovery of 92.6% from 100% extension and an extension of 320% at break.

Example 15

A low molecular weight 6:2-nylon was prepared by the following method:

A mixture of 202 parts dibutyl oxalate, 500 parts dimethyl formamide is stirred vigorously and a mixture of 58 parts hexamethylenediamine, 500 parts dimethylformamide is added over 10 minutes. The solution is stirred for 15 minutes and 196.5 parts aminocaproic acid are added. The mixture is refluxed for 1½ hours, cooled and the product filtered off. The product has a molecular weight of 480.

A mixture of the following:

18 parts 6,2 nylon prepared as above
31.4 parts sebacic acid
26.6 parts 2,2-dimethyl-1,3-propanediol
0.2 part tetrabutyl titanate is heated and stirred under nitrogen at 220° C. for 3 hours and then vacuum (15 mm.) applied at this temperature for 1 hour. The temperature is raised to 260° C. and high vacuum applied for 1¾ hours.

The product (softening point 165–184° C.) could be melt spun into fibres which without drawing had a tenacity of 0.1 gram/denier, an elastic recovery of 95.4% from 100% extension and an extension of 257% at break.

Example 16

A mixture of the following:

20 parts low molecular weight 6,2 nylon prepared as in Example 15
46.7 parts poly(2,2-dimethyl-1,3-propanediol sebacate) M.W. 2000 (prepared as in Example 2)
4 parts 2,2-dimethyl-1,3-propanediol
0.2 part tetrabutyl titanate is heated and stirred under nitrogen at 220° C. for 2 hours and then at a temperature of 260° C. for 2 hours. Heating is continued at this temperature for 1 hour under vacuum (15 mm.) high vacuum then being applied for 2½ hours.

The product (softening point 161–197° C.) could be melt spun into fibres which, after being drawn at a ratio of 5.5×, had a tenacity of 0.3 gram/denier, an elastic recovery from 100% extension of 95.8% and an extension at break of 295%.

Example 17

A mixture of the following:

35 parts nylon 6 T-salt (hexamethylenediamine terephthalate)
70 parts poly(2,2-dimethyl-1,3-propanediol sebacate) M.W. 3700 (prepared as in Example 2)
20 parts 2,2-dimethyl-1,3-propanediol
1 part tetrabutyl titanate
1 part triphenyl phosphite is heated with stirring under nitrogen at 260° C. for 3 hours, heating is continued at this temperature and high vacuum applied for 1¾ hours.

The product (softening point 149–190° C.) could be melt spun into fibres which after being drawn at a ratio of 4.0× at a temperature of 70° C., had a tenacity of 0.3 gram/denier, an elastic recovery from 100% extension of 93.6% and an extension of 207% at break.

Example 18

A mixture of the following:

36 parts nylon 6,10 salt
24 parts nylon 6,T salt
11.65 parts sebacic acid is heated and stirred under nitrogen at 280° C. for 3 hours and then vacuum (15 mm.) applied at this temperature for 1 hour. High vacuum is then applied for ½ hour. The product, of molecular weight approximately 1700, has predominantly carboxylic end groups.

A mixture of the following:

30 parts 6,10/6,T copolyamide prepared as above
53 parts sebacic acid
36 parts 2,2-dimethyl-1,3-propanediol
0.3 part tetrabutyl titanate is heated with stirring under nitrogen at 220° C. for 2 hours and then at a temperature of 260° C. for 2 hours. Heating at this temperature is continued for 1 hour under vacuum (15 mm.) and then high vacuum applied for 1 hour.

The product (softening point 161–184° C.) could be melt spun into fibres which, after being drawn at a ratio of 5.5×, had a tenacity of 0.3 gram/denier, an elastic recovery of 94.9% from 100% extension and an extension of 256% at break.

Example 19

A mixture of the following:

27 parts 6,6-nylon prepared as in Example 12 of M.W. 730
3.5 parts nylon 6,T-salt 70 parts poly(2,2-dimethyl - 1,3 - propanediol sebacate) M.W. 3,700 (prepared as in Example 2)
20 parts 2,2-dimethyl-1,3-propanediol
1 part tetrabutyl titanate
1 part triphenyl phosphite is heated with stirring under nitrogen at 260° C. for 3 hours and then high vacuum applied at this temperature for 2 hours.

The product (softening point 197–213° C.) could be melt spun into fibres which, after being drawn at a ratio of 5.5×, had a tenacity of 0.3 grams/denier, an elastic recovery from 100% extension of 97% and an extension at break of 280%.

Example 20

A mixture of the following:

20 parts nylon 6,6-salt
20 parts nylon 6,T-salt
60 parts poly(2,2-dimethyl - 1,3 - propanediol sebacate) M.W. 3,700 (prepared as in Example 2)
20 parts 2,2-dimethyl-1,3-propanediol
1 part tetrabutyl titanate
1 part triphenyl phosphite is heated with stirring under nitrogen at 260° C. for 3 hours and then high vacuum applied at this temperature for 2 hours.

The product (softening point 104–161° C.) could be melt spun into fibres which without drawing had a tenacity of 0.2 gram/denier, an elastic recovery from 100% extension of 90% and an extension at break of 384%.

Example 21

A mixture of the following:

38.9 parts nylon 6,6-salt
44 parts adipic acid
39 parts 2,2-dimethyl-1,3-propanediol
0.75 part tetrabutyl titanate
0.75 part triphenyl phosphite is heated with stirring under nitrogen at 240° C. for 3 hours and then high vacuum applied at this temperature for 8 hours.

The product (softening point 160–174° C.) could be melt spun into fibres which, after being drawn at a ratio of 5.0×, had a tenacity of 0.6 gram/denier, an elastic recovery of 96.5% from 50% extension and an extension of 276% at break.

Example 22

A mixture of the following:

2075 parts adipic acid
1700 parts 2,2-dimethyl-1,3-propanediol is heated and stirred under nitrogen, the temperature being raised to 240° C. over a period of 5½ hours and then stirred at this temperature for 10½ hours. The resulting polyester has a molecular weight of 2200 and a ratio of hydroxyl to carboxyl end groups of 17:1.

A mixture of the following:

30 parts poly(2,2-dimethyl - 1,3 - propanediol adipate) prepared as above
30 parts poly(2,2-dimethyl - 1,3 - propanediol sebacate) M.W. 3,600 prepared as in Example 2
35.5 parts nylon 6,6-salt
9 parts adipic acid
10 parts 2,2-dimethyl-1,3-propanediol
1 part tetrabutyl titanate
1 part triphenyl phosphite is heated with stirring under nitrogen at 240° C. for 3 hours and then high vacuum applied at this temperature for 6 hours.

The product (softening point 191–201° C.) could be melt spun into fibres which, after being drawn at a ratio of 7.0×, had a tenacity of 0.31 gram/denier, an elastic recovery of 95.6% from 100% extension and an extension of 220% at break.

Example 23

A mixture of the following:

30 parts 6,10 nylon prepared as in Example 7
18 parts 2,2-dimethyl-1,3-propanediol
11 parts ethylene glycol
53 parts sebacic acid
0.2 part tetrabutyl titanate is heated and stirred under nitrogen at 180° C. for 2 hours and then at a temperature of 220° C. for 2 hours. The temperature is further increased to 260° C. for a period of 2 hours and vacuum (15 mm.) applied at this temperature for 1 hour. High vacuum is then applied for 2 hours.

The product (softening point 135–149° C.) could be melt spun into fibres which, after being drawn at a ratio of 5.5×, had a tenacity of 0.6 gram/denier, an elastic recovery from 50% extension of 97.0% and an extension of 316% at break.

Example 24

A mixture of the following:

30 parts 6,10 nylon prepared as in Example 1
8.9 parts propane-1,2-diol
6.05 parts ethylene glycol
30 parts sebacic acid
0.75 part anhydrous zinc chloride is heated and stirred under nitrogen at 220° C. for 2 hours and then at a temperature of 260° C. for 3½ hours. Vacuum (15 mm.) is then applied at 260° C. for 50 minutes.

The product (softening point 150° C.) was a rubbery solid.

What we claim is:

1. A process for the manufacture of elastomeric block copolymers having a molecular weight greater than 8000 containing polyamide and polyester segments in a ratio within the range 10:90 to 60:40 by weight, said process comprising copolymerizing polyamide having a molecular weight within the range 400 to 20,000 with (i) a polyester having a molecular weight within the range 1000 to 5000 and a melting point below 60° C. of an alkylene glycol with an aliphatic dicarboxylic acid or of an aliphatic hydroxy carboxylic acid or (ii) polyester-forming components which on polycondensation yield said polyester or copolymerizing said polyester with polyamide-forming components which on polycondensation yield said polyamide, the copolymerization being effected by heating at a temperature within the range 200°–300° C. for from 5 to 20 hours in the presence of an esterification or ester-amide interchange catalyst.

2. The process of claim 1 in which there is incorporated in the copolymerisation mixture up to about 2% of a polyfunctional acid, amine or alcohol the functionality of which is three or more.

3. The process of claim 1 in which there is included in the copolymerisation mixture a proportion of a glycol.

4. The process of claim 1 in which an antioxidant is incorporated in the copolymerisation mixture.

5. The process of claim 1 in which said polyester is poly-2,2-dimethyl-1,3-propanediol sebacate.

6. A process according to claim 1 for the manufacture of elastomeric block copolymers in which a polyamide having a molecular weight within the range 400 to 20,000 is copolymerized with a mixture of polyester-forming components consisting of a mixture of an alkylene glycol and an aliphatic dicarboxylic acid.

7. The process of claim 6 in which the polyamide is polyhexamethylene adipamide, polyhexamethylene sebacamide, dodecamethylene terephthalamide, polyhexamethylene oxamide, polyhexamethylene terephthalamide or polycaprolactam.

8. The process of claim 6 in which the alkylene glycol is 2,2-dimethyl-1,3-propanediol.

9. The process of claim 6 in which the aliphatic dicarboxylic acid is adipic acid or sebacic acid.

10. The process of claim 6 in which the ratio of polyamide to polyester segments is about 30:70 by weight.

References Cited

UNITED STATES PATENTS

| | | | |
|---|---|---|---|
| 3,369,057 | 2/1968 | Twilley | 260—857 |
| 3,378,055 | 4/1968 | Robertson | 260—875 |
| 3,378,056 | 4/1968 | Robertson | 260—857 |
| 3,378,602 | 4/1968 | Robertson | 260—857 |
| 3,382,305 | 5/1968 | Breen | 260—857 |
| 3,386,967 | 6/1968 | Twilley | 260—857 |

FOREIGN PATENTS 610,140  10/1948  Great Britain.

SAMUEL H. BLECH, Primary Examiner

PAUL LIEBERMAN, Assistant Examiner

U.S. Cl. X.R.

260—78, 75